(12) United States Patent
Grohoski et al.

(10) Patent No.: US 7,996,632 B1
(45) Date of Patent: Aug. 9, 2011

(54) DEVICE FOR MISALIGNED ATOMICS FOR A HIGHLY-THREADED X86 PROCESSOR

(75) Inventors: Greg F. Grohoski, Bee Cave, TX (US); Mark A. Luttrell, Cedar Park, TX (US); Manish Shah, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 568 days.

(21) Appl. No.: 11/615,914

(22) Filed: Dec. 22, 2006

(51) Int. Cl.
*G06F 12/00* (2006.01)

(52) U.S. Cl. ............ 711/154; 711/5; 711/118; 711/145; 711/155; 711/170; 711/171; 712/216; 710/37

(58) Field of Classification Search .............. 711/5, 118, 711/145, 154–155, 170, 171; 712/216; 710/37
See application file for complete search history.

(56) References Cited

U.S. PATENT DOCUMENTS

| | | | |
|---|---|---|---|
| 5,430,860 A * | 7/1995 | Capps et al. ................. | 711/155 |
| 5,632,025 A * | 5/1997 | Bratt et al. .................... | 711/152 |
| 5,761,731 A * | 6/1998 | Van Doren et al. ........... | 711/155 |
| 7,043,609 B2 | 5/2006 | Melamed et al. | |
| 7,133,950 B2 | 11/2006 | Olukotun | |
| 7,136,308 B2 | 11/2006 | Kant et al. | |
| 7,178,005 B1 | 2/2007 | Jordan et al. | |
| 7,185,178 B1 | 2/2007 | Barreh et al. | |
| 7,185,185 B2 | 2/2007 | Joy et al. | |
| 7,360,035 B2 * | 4/2008 | Jenkins et al. ................ | 711/150 |
| 2005/0010729 A1 * | 1/2005 | Silvera et al. ................. | 711/150 |

* cited by examiner

*Primary Examiner* — Sanjiv Shah
*Assistant Examiner* — Arpan P. Savla
(74) *Attorney, Agent, or Firm* — Polsinelli Shughart PC

(57) ABSTRACT

A multithreaded processor with a banked cache is provided. The instruction set includes at least one atomic operation which is executed in the L2 cache if the atomic memory address source data is aligned. The core executing the instruction determines whether the atomic memory address source data is aligned. If it is aligned, the atomic memory address is sent to the bank that contains the atomic memory address source data, and the operation is executed in the bank. In one embodiment, if the instruction is mis-aligned, the operation is executed in the core.

15 Claims, 6 Drawing Sheets

DEVICE FOR MISALIGNED ATOMICS FOR A HIGHLY-THREADED X86 PROCESSOR

FIELD OF THE INVENTION

The invention is related to processor and/or computer design and operation, and in particular but not exclusively, to a device for executing mis-aligned atomic operations in a highly-threaded x86 processor.

BACKGROUND OF THE INVENTION

A processor may reduce wasted time resulting from stalling and idling, and increase the proportion of execution time, by supporting and implementing both horizontal multithreading and vertical multithreading. Vertical multithreading may permit overlapping or "hiding" of cache miss wait times. In vertical multithreading, multiple hardware threads share the same processor pipeline. A hardware thread is typically a process, a lightweight process, a native thread, or the like in an operating system that supports multithreading. Horizontal multithreading may increase parallelism within the processor circuit structure. To further increase system parallelism in some processors, multiple processor cores are formed in a single die.

BRIEF DESCRIPTION OF THE DRAWINGS

Non-limiting and non-exhaustive embodiments of the present invention are described with reference to the following drawings, in which.

DETAILED DESCRIPTION

Figure 1:
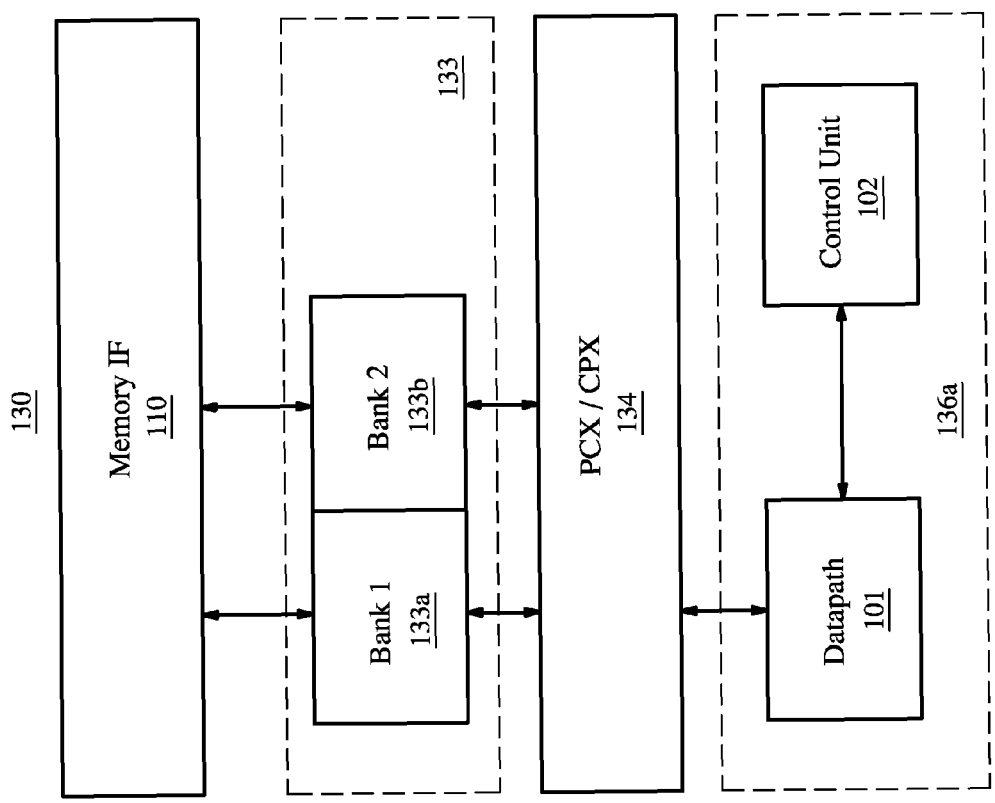
FIG. 1 shows a block diagram of an embodiment of a device.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

For purposes of clarity, it is noted here that the term "misaligned" may have two related but distinct meanings. Accordingly to a first meaning, the term "misaligned" refers to an address that is not a multiple of its size. According to a second meaning, the term "misaligned" refers to crossing a cache line, i.e., the memory address source data is split among more than one cache bank. An instruction that is "misaligned" according to the first meaning may be, but is not necessarily, misaligned accordingly to the second meaning. In this document, the term "misaligned" is used in accordance with the second meaning unless the context clearly dictates otherwise.

Briefly stated, the invention is related to a multithreaded processor with a banked cache. The instruction set includes at least one atomic operation which is executed in the L2 cache if the atomic memory address source data is aligned. The core executing the instruction determines whether the atomic memory address source data is aligned. If it is aligned, the atomic memory address is sent to the bank that contains the atomic memory address source data, and the operation is executed in the bank. In one embodiment, if the instruction is mis-aligned, the operation is executed in the core.

Exemplary Embodiment of a Device:

FIG. 1 shows a block diagram of an embodiment of device 130. In one embodiment, device 130 may be employed as part of a computer system. Device 130 includes processor 136*a*, processor-to-cache interface/cache-to-processor interface (PCX/CPX) 134, banked cache 133, and memory interface (IF) 110. Various embodiment of device 130 may include many more components than are illustrated in FIG. 1. Processor 136*a* includes datapath 101 and control unit 102. Also, banked cache 133 includes bank 1 (133*a*) and bank 2 (133*b*).

Processor 136*a* is arranged to process instructions in accordance with an instruction set architecture. The instruction set architecture includes at least one atomic operation. An atomic operation is one in which a load, an arithmetic or logical operation, and a store are each performed atomically within the same operation. Some of these steps may be conditional; for example, in some operations, the store is either performed or not performed depending on the result(s) of the operation. In an atomic operation, the load, the operation, and the store are performed atomically, so that intermediate results are inaccessible to other threads. Also, the instruction set architecture used by processor 136*a* is such that misaligned storage accesses are possible, so that it is possible for the memory address source data to be split among two or more banks in banked cache 133. In one embodiment, the instruction set used by processor 136*a* is the x86 instruction set. In the x86 instruction set, there are atomic operations that may be misaligned.

In most cases, well-behaved programs are designed so that the shared variables are aligned. Accordingly, the frequent case should be that the shared variables are aligned. However, device 130 also deals with the case in which shared variables are not aligned, even though the performance for the mis-aligned case may be reduced relative to the aligned case.

Processor 136a is arranged to control execution of atomic instructions as follows. After the memory address is generated, processor 136a determines whether the memory address is aligned (i.e., whether the source data of the memory address is included in its entirety in one bank of banked cache 133). If it is aligned, processor 136a enables the bank with cache 133 that includes the memory address to perform the arithmetic or logical operation of the atomic operation. In one embodiment, performance of the arithmetic or logical operation of mis-aligned atomic operations is handled within processor 136a.

In one embodiment, only one atomic instruction (out of all of the atomic instructions in the instruction set) is performed in the cache in the case of an aligned instruction. In other embodiments, all atomic instructions that are aligned are performed in the cache. In yet other embodiments, more than one, but not all, of the atomic instructions in the instruction set, are performed in the cache when the instruction is aligned. In embodiments in which two or more instructions in the instruction set involving different arithmetic or logical operations are executed in the cache if the atomic operations are aligned, then processor 136a communicates which arithmetic or logical operation is to be performed to banked cache 133. In embodiments in which only one atomic operation in the instruction set is performed by the cache if the instruction is aligned, the arithmetic or logical operation to be performed need not be communicated to banked cache 133.

PCX/CPX 134 is arranged to enable communication between at least processor 136a and banked cache 133.

Additionally, banked cache 133 includes at least two banks, including bank 1 (133a) and bank 2 (133b). Each bank in banked cache 133 is arranged to perform an arithmetic or logical operation of an aligned atomic instruction. Also, banked cache 133 is arranged for communication with processor 136a via PCX/CPX 134, and with a memory via memory interface IF 110.

Figure 2:
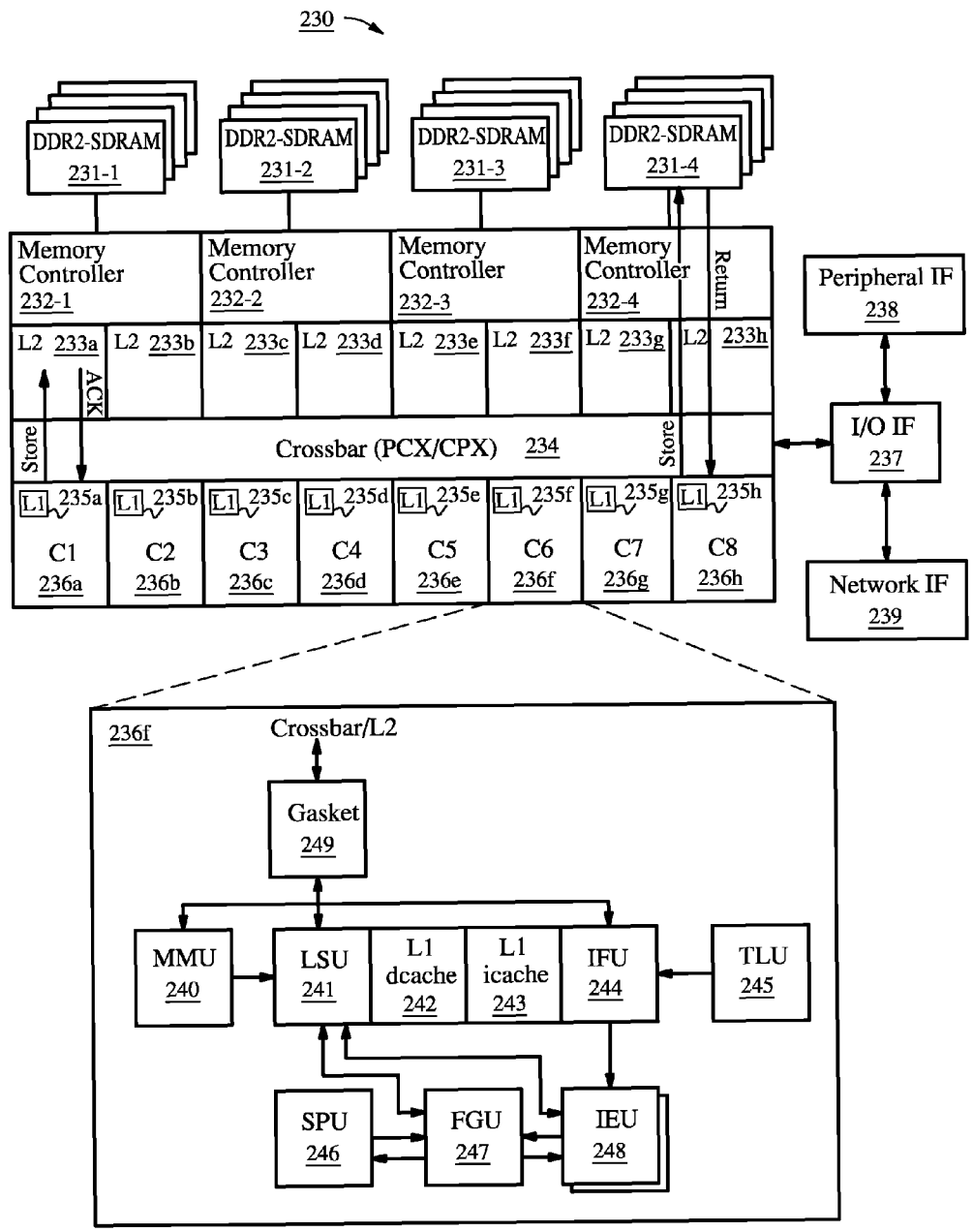
FIG. 2 illustrates a block diagram of an embodiment of the device of FIG. 1.

Exemplary Embodiment of a Multi-Threaded, Multi-Core Processor Chip for One Embodiment of the Invention:

FIG. 2 illustrates a block diagram of an embodiment of processor chip 230, which may be employed as an embodiment of device 130 of FIG. 1. L2 cache 233 is an embodiment of banked cache 133 of FIG. 1, and memory controller(s) 232 are an embodiment of memory IF 110 of FIG. 1. Processor chip 230 includes multiple processor cores for processing multiple threads. In the illustrated embodiment, processor chip 230 includes a plurality of processor cores 236a-h, which are also designated "C1" though "C8." Each of cores 236 is coupled to L2 cache 233 via crossbar 234. In the illustrated embodiment, L2 cache 233 is coupled to memory controller(s) 232, which are coupled in turn to one or more banks of system memory 231. Additionally, in this embodiment, crossbar (PCX/CPX) 234 couples cores 236 to input/output (I/O) interface 237, which is in turn coupled to a peripheral interface 238 and a network interface 239.

In the illustrated embodiment, each of cores 236 may be configured to operate independently of the others, such that all cores 236 may execute in parallel. In some embodiments, each of cores 236 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multi-threaded (MT) core. In the embodiment shown in FIG. 2, each processor core includes eight threads. Thus, a single processor chip 230 with eight cores (C1 through C8) has sixty-four threads in this configuration. However, the invention is not limited to eight processor cores; more or fewer cores can be included. In other embodiments, the core may process different numbers of threads.

Each processor core 236a-236h is in communication with crossbar 234 which manages data flow between cores 236 and the shared L2 cache 233 and may be optimized for processor traffic where it is desirable to obtain extremely low latency. Crossbar 234 may be configured to concurrently accommodate a large number of independent accesses that are processed on each clock cycle, and enables communication data requests from cores 236 to L2 cache 233, as well as data responses from L2 cache 233 to cores 236. In one embodiment, crossbar 234 may include logic (such as multiplexers or a switch fabric, for example) that allows any core 236 to access any bank of L2 cache 233, and that conversely allows data to be returned from any L2 bank to any core. Crossbar 234 may also include logic to queue data requests and/or responses, such that requests and responses may not block other activity while waiting for service. Additionally, in one embodiment crossbar 234 may be configured to arbitrate conflicts that may occur when multiple cores attempt to access a single bank of L2 cache 233 or vice versa. Accordingly, in this embodiment the multiple processor cores 236a-236h share a second level (L2) cache 233 through a crossbar bus 234.

The shared L2 cache 233 accepts requests from the processor cores 236 on the Processor-to-cache crossbar (PCX) 234 and responds on the cache-to-processor crossbar (CPX) 234. As described herein, in one embodiment L2 cache 233 includes eight banks that are shared by the processor cores 236a-236h. By sharing L2 cache banks, concurrent access may be made to the multiple banks, thereby defining a high bandwidth memory system. The invention is not limited to eight L2 cache banks or to any particular size, but the illustrated embodiment should be sufficient to provide enough bandwidth from the L2 cache to keep all of the cores busy most of the time. L2 cache 233 may be configured to cache instructions and data for use by cores 236. In the illustrated embodiment, L2 cache 233 may be organized into eight separately addressable banks that may each be independently accessed, such that in the absence of conflicts, each bank may concurrently return data to a respective core 236. L2 cache 233 may be implemented in some embodiments as a write-back cache in which written (dirty) data may not be written to system memory until the corresponding cache line is evicted.

In connection with the example described herein, each processor core (e.g. 236a-h) shares an L2 cache memory 233 to speed memory access and to overcome the delays imposed by accessing remote memory subsystems (e.g., 231). Cache memory comprises one or more levels of dedicated high-speed memory holding recently accessed data, designed to speed up subsequent access to the same data. When data is read from main memory (e.g., 231), a copy is also saved in the L2 cache 233, and an L2 tag array stores an index to the associated main memory. The L2 cache 233 then monitors subsequent requests for data to see if the information needed has already been stored in the L2 cache. If the data had indeed been stored in the cache (i.e., a "hit"), the data is delivered immediately to the processor core 236 and the attempt to fetch the information from main memory 231 is aborted (or not started). If, on the other hand, the data had not been previously stored in the L2 cache (i.e., a "miss"), the data is fetched from main memory 231 and a copy of the data and its address is stored in the L2 cache 233 for future access.

In some embodiments, L2 cache 233 may implement queues for requests arriving from and results to be sent to crossbar 234. Additionally, in some embodiments L2 cache 233 may implement a fill buffer (not shown in FIG. 2) configured to store fill data arriving from memory controller 232, a write-back buffer (WBB) (not shown in FIG. 2) configured to store dirty evicted data to be written to memory, and/or a miss buffer (not shown in FIG. 2) configured to store L2 cache accesses that cannot be processed as simple cache hits (e.g., L2 cache misses, cache accesses matching older misses, accesses such as atomic operations that may require multiple cache accesses, etc.). L2 cache 233 may variously be implemented as single-ported or multi-ported (i.e., capable of processing multiple concurrent read and/or write accesses). In either case, L2 cache 233 may implement arbitration logic to prioritize cache access among various cache read and write requestors.

L2 cache 233 is in communication with main memory controller 232 to provide access to the external memory 231 or main memory (not shown). Memory controller 232 may be configured to manage the transfer of data between L2 cache 233 and system memory, for example in response to L2 fill requests and data evictions. In some embodiments, multiple instances of memory controller 232 may be implemented, with each instance configured to control a respective bank of system memory. Memory controller 232 may be configured to interface to any suitable type of system memory, such as Double Data Rate or Double Data Rate 2 Synchronous Dynamic Random Access Memory (DDR/DDR2 SDRAM), or Rambus DRAM (RDRAM), for example. In some embodiments, memory controller 232 may be configured to support interfacing to multiple different types of system memory.

In the illustrated embodiment, processor chip 230 may be configured to receive data from sources other than system memory 231. I/O interface 237 may be configured to provide a central interface for such sources to exchange data with cores 236 and/or L2 cache 233 via crossbar 234. In some embodiments, I/O interface 237 may be configured to coordinate Direct Memory Access (DMA) transfers of data between network interface 239 or peripheral interface 238 and system memory 231 via memory controller 232. In addition to coordinating access between crossbar 234 and other interface logic, in one embodiment, I/O interface 237 may be configured to couple processor chip 230 to external boot and/or service devices. For example, initialization and startup of processor chip 230 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor chip 230, before the boot process proceeds to load data from a disk or network device. Additionally, in some embodiments such an external device may be configured to place processor chip 230 in a debug, diagnostic, or other type of service mode upon request.

Peripheral interface 238 may be configured to coordinate data transfer between processor chip 230 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 238 may implement one or more instances of an interface such as Peripheral Component Interface Express (PCI-Express), although any suitable interface standard or combination of standards may be employed. For example, in some embodiments, peripheral interface 238 may be configured to implement a version of Universal Serial Bus (USB) protocol or IEEE 1394 (Firewire) protocol in addition to or instead of PCI-Express.

Network interface 239 may be configured to coordinate data transfer between processor chip 230 and one or more devices (e.g., other computer systems) coupled to processor chip 230 via a network. In one embodiment, network interface 239 may be configured to perform the data processing necessary to implement an Ethernet (IEEE 802.3) networking standard such as Gigabit Ethernet or 10-gigabit Ethernet, for example, although any suitable networking standard may be implemented. In some embodiments, network interface 239 may be configured to implement multiple discrete network interface ports.

The multiprocessor chip 230 may be configured for multi-threaded execution. More specifically, in one embodiment, each of cores 236 may be configured to perform fine-grained multithreading, in which each core may select instructions to execute from among a pool of instructions corresponding to multiple threads, such that instructions from different threads may be scheduled to execute adjacently. For example, in a pipelined embodiment of core 236f, employing fine-grained multithreading, instructions from different threads may occupy adjacent pipeline stages, such that instructions from several threads may be in various stages of execution during a given core processing cycle. The example core 236f includes an instruction fetch unit (IFU) 244 that is coupled to a memory management unit (MMU) 240, a trap logic unit (TLU) 245, and at least one instruction execution unit (IEU) 248. In this example, each of execution units 248 is coupled to both a floating point/graphics unit (FGU) 247 and a load store unit (LSU) 241. Further, LSU 241 is also coupled to send data back to each of execution units 248 and FGU unit 247. FGU 247 is coupled to a stream processing unit (SPU) 246. Additionally, LSU 241, IFU 244, SPU 246, and MMU 240 are coupled to a gasket or interface unit 249 for interface to the crossbar 234.

As depicted, each threaded core (e.g., C6 236f) may include a first level (L1) cache (e.g., 235f) which includes a data cache (dcache) segment 242 and an instruction cache (icache) segment 243. In operation, according to one embodiment, the instruction fetch unit (IFU) 244 retrieves instructions for each thread and stores them in an instruction cache 243 and instruction buffers (not shown). IFU 244 then selects two instructions to execute among eight different threads, and provides the instructions to the decode unit which decodes one instruction each from two thread groups per cycle and supplies the pre-decoded instruction to execution units 248. Each instruction execution unit may include an arithmetic logic unit (ALU), shifter, integer register files for processing and storing thread status information. In one embodiment, execution unit results are supplied via selection circuits to the shared FGU 247 and LSU 241. In this embodiment, the shared LSU 241 handles memory references between the processor core, the L1 data cache, and the L2 cache. A single data cache 242 may also be provided for LSU 241.

LSU 241 operates as follows for atomic instructions in one embodiment. LSU 241 determines whether the memory address is aligned. If the memory address is aligned, LSU 241 sends the memory address and the arithmetic or logical operation to be performed to the L2 cache that contains the source data, for execution of the arithmetic or logical operation by the L2 cache. (In an embodiment in which only one type of operation can be performed in the cache, LSU 241 need not send the operation to the cache). If the memory address is mis-aligned, LSU 241 controls retrieval and combination of all of the source data (as well as subsequent storage of the result).

In one embodiment, for atomic operations, a "two-step" process is performed if the atomic instruction is aligned, and a "four-step" process is performed in the atomic instruction is mis-aligned. For example, in one embodiment, the operation Compare and Exchange Eight Bytes (CMPXCH8B) is an atomic instruction in the x86 instruction set for which cache execution is performed if the atomic instruction is aligned. In this embodiment, if the CMPXCH8B instruction is aligned, a two-step process is performed as follows. Step 1: Send EDX: EAX 64-bit compare value memory address and ECX:EBX exchange value to L2 bank 533. L2 bank 533 fetches the memory contents, and compares the memory contents with EDX:EAX. If they match, L2 bank 533 writes ECX:EBX to the memory location. Step 2: Return match indicator and previous value of memory location to the core 236.

In this embodiment, if the CMPXCH8B is mis-aligned, a four-step process is performed as follows. Step 1: Fetch memory location contents to core and lock fetched memory lines. Step 2: Perform comparison. Step 3: If there is a match, store exchange value to memory and unlock associated lines. Step 4: Return ACK to core.

The two-step process is significantly more efficient than the four step process. By performing the two-step process in the (presumably) frequent aligned case and the four-step process in the infrequent mis-aligned case, the frequent aligned cases can be executed efficiently, while ensuring that the mis-aligned cases execute correctly.

In one embodiment, the x86 instruction set is used, and the CMPXCH8B and CMPXCHG16B instructions are executed in the cache if the instruction is aligned, and the other instructions in the x86 instruction set are not performed in the cache. In another embodiment, each bank in the L2 cache includes an ALU, and many atomic instructions other than the compare-and-exchange instructions are also performed in the cache if the instruction is aligned.

A lock mechanism may be used to prevent other threads from accessing an intermediate value during an atomic operation, which preserves atomicity and global ordering. In one embodiment, the lock is an attribute that flows along with the request. For example, the lock may be indicated by a bit, as a wire that is included with the request.

In different embodiments, the lock may be implemented in different ways. In one embodiment, the thread performing the locked operation locks all banks in the L2 cache, preventing any other thread from accessing memory until the locked operation is complete. In another embodiment, the thread performing the locked operations locks just the bank(s) involved in the operation. In this embodiment, the crossbar does not allow other threads to access those banks until the operation is complete and the lock released. In yet another embodiment, the lock indication is sent with the request to the L2, and the L2 blocks further access to just that line. In this embodiment, there is a path by which the "store" operation can bypass into the pipe if the L2 input queue is full.

In one embodiment, processor chip 230 can perform multiple atomic operations in parallel to separate cache lines of L2 cache 233. In one embodiment, this is accomplished by separate threads accessing separate cache lines within a single bank of L2 cache 233. In another embodiment, this is accomplished by accessing separate cache lines between separate banks of L2 cache 233.

Although an embodiment in which the L2 cache is the banked cache in which cache execution may be performed has been illustrated in FIG. 2 and described herein, in other embodiments, this may be a layer other than L2. For example, in one embodiment, cache L1 may be excluded from the cores, which would then technically make the bank 233 the L1 cache. In another embodiment, cache L1 may remain included, with one or more additional layer of cache included between the L1 cache and the L2 cache 233, which would technically make cache 233 a level of cache higher than L2.

Figure 3:
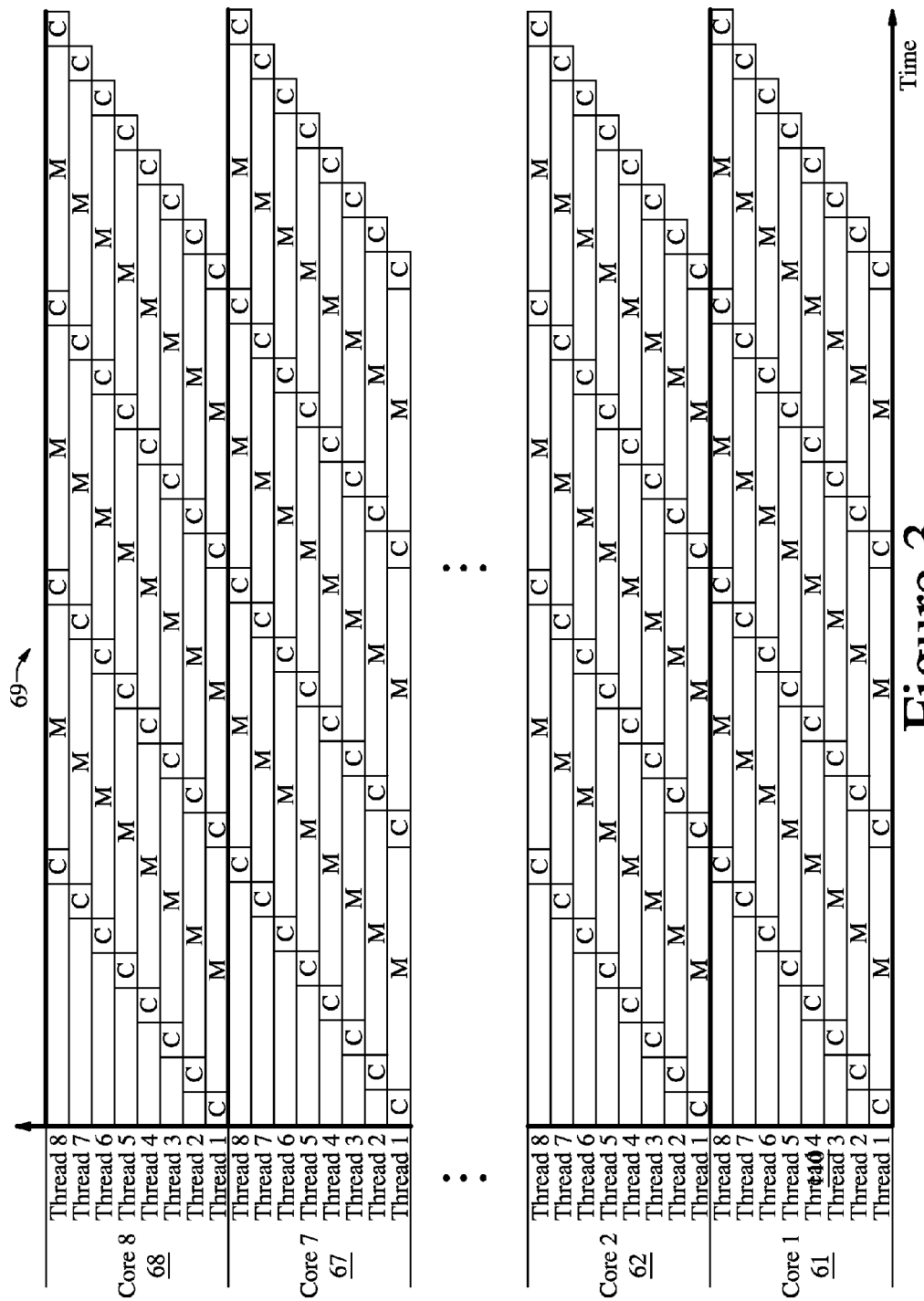
FIG. 3 shows a timing diagram illustrating execution flow for an embodiment of the device of FIG. 2.

FIG. 3 shows a timing diagram illustrating execution flow of one vertical and horizontal multithread multiprocessor embodiment of processor chip 230 of FIG. 2 using a high-throughput architecture with eight processor cores 61-68, each having eight threads. In FIG. 3, the execution flow for a given vertical threaded processor 61 (e.g., Core 1) includes execution of multiple threads (e.g., Threads 1-8). For each thread in each core, the areas labeled "C" show periods of execution and the areas labeled "M" show time periods in which a memory access is underway, which would otherwise idle or stall the processor core. Thus, in the first processor core (Core 1), Thread 1 uses the processor core (during the times labeled as "C") and then is active in memory (during the times labeled as "M"). While Thread 1 in a given core is active in memory, Thread 2 in that same core accesses the processor core and so on for each of Threads 3-8. Vertical multithread processing is implemented by maintaining a separate processing state for each executing thread on a processing core. With only one of the threads being active at one time, each vertical multithreaded processor core switches execution to another thread during a memory access, such as on a cache miss. In this way, efficient instruction execution proceeds as one thread stalls and, in response to the stall, another thread switches into execution on the otherwise unused or idle pipeline. In essence, the pipeline overlaps the execution of multiple threads to maximize processor core pipeline utilization. The multiplicity of thread operations from a vertically threaded processor (e.g., core 1) employs a memory system that can process multiple references or threads simultaneously. For example, multiple memory operations are coordinated so that each thread can store data to the first level (L1) cache 235, second level (L2) cache 233, third level (L3) cache or other higher order cache (not shown), and/or system memory in an ordered and coherent way with minimal delay or latency.

In accordance with one embodiment of the present invention, the processor cores can be replicated a number of times in the same area. This is also illustrated in FIG. 3, which illustrates the timing diagram for an execution flow of a horizontal threaded processor using a technique called chip multiprocessing. This technique combines multiple processor cores on a single integrated circuit die. By using multiple vertically threaded processors—each of which (e.g., Core 1) is vertically threaded—a processor system is formed with both vertical and horizontal threading, augmenting executing efficiency and decreasing latency in a multiplicative fashion.

The execution flow 60 illustrated in FIG. 3 for a vertical and horizontal threaded processor includes execution of threads 1-8 on a first processor core (Core 1), execution of threads 1-8 on a second processor core (Core 2), and so on with processor cores 3-8. Execution of threads 1-8 on the first processor core (Core 1) illustrates vertical threading. Similarly, execution of threads 1-8 on the second processor (Core 2) illustrates vertical threading. Where a single system or integrated circuit includes more than one processor core, the multiple processor cores executing multiple threads in parallel is a chip multi-threading (CMT) processor system. The combination of vertical multithreading and horizontal multithreading increases processor parallelism and performance, and attains an execution efficiency that exceeds the efficiency of a processor with only vertical multithreading.

The combination of vertical multithreading and horizontal multithreading also reduces communication latency among local (on-chip) multi-processor tasks by eliminating much signaling on high-latency communication lines between integrated circuit chips. Horizontal multithreading further exploits processor speed and power improvements that inherently result from reduced circuit sizes in the evolution of silicon processing.

Figure 4:
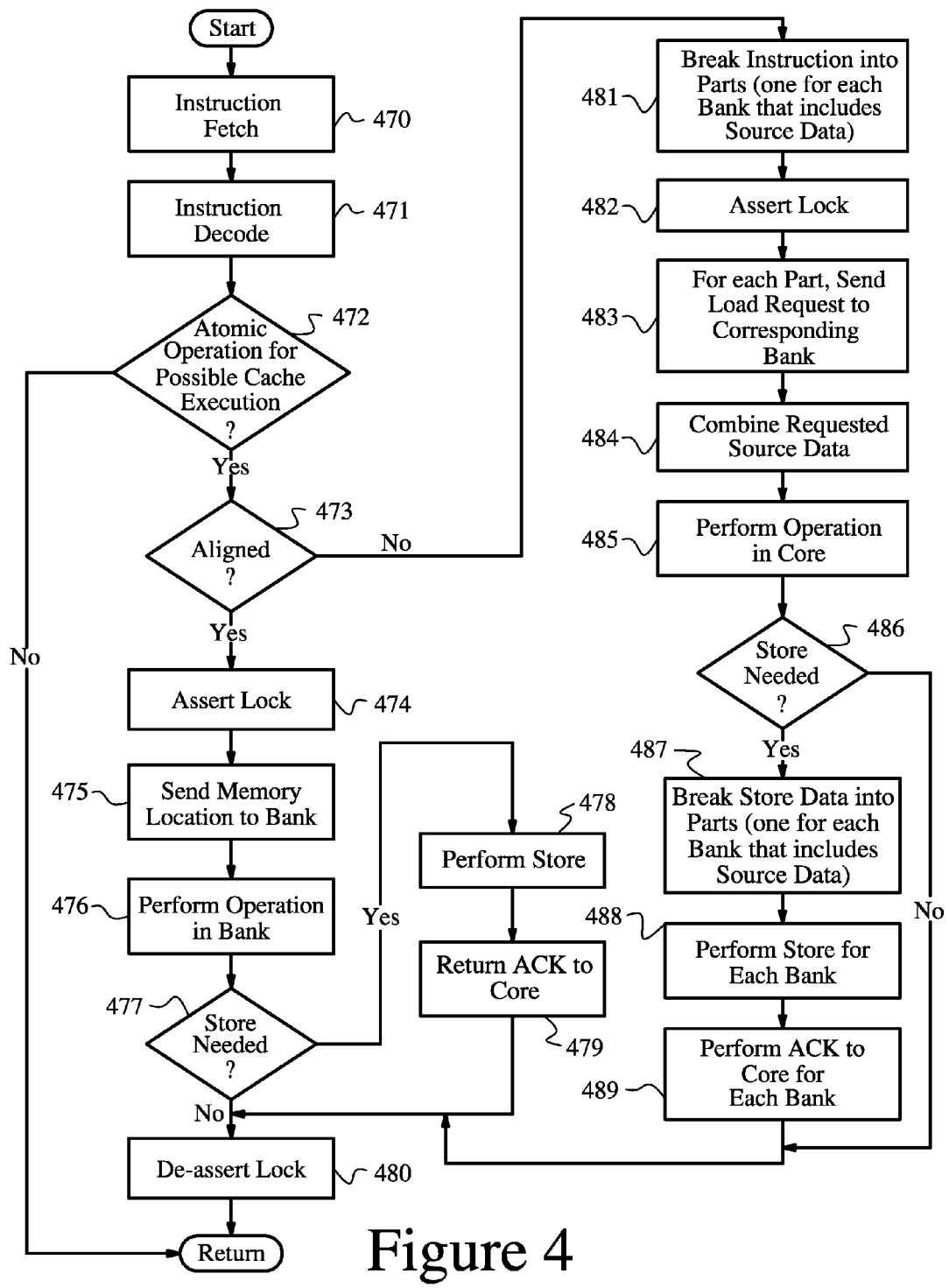
FIG. 4 illustrates a flow chart of an embodiment of a process for an embodiment of the device of FIG. 1 or FIG. 2.

Exemplary Embodiment of a Process:

FIG. 4 illustrates a flow chart of an embodiment of a process, which may be performed by an embodiment of device 130 of FIG. 1 or an embodiment of processing chip 230 of FIG. 2. Various embodiments may include more or less steps that shown in FIG. 4 and described herein. After a start block, the process proceeds to block 470, where an instruction is fetched from the instruction memory. The process then advances to block 471, where the instruction is decoded.

The process then moves to decision block 472, where a determination is made as to whether the instruction is a type of instruction that will be executed in the banked cache if the instruction is aligned. If not, the process proceeds to the return block, where other processing is resumed. However, if the determination at decision block 472 is positive, the process proceeds to decision block 473, where a determination is made as to whether the instruction is aligned. If so, the process moves to block 474, where a lock condition is asserted (e.g. with a lock bit). The process then advances to block 475, where the processor sends the atomic memory address and operand data to the banked cache (more specifically, to the bank which contains the source data for the atomic memory address). In an embodiment which more than one type of atomic operation may be executed in the banked cache, the processor also communicates the arithmetic or logical operation to be performed to the banked cache.

The process then proceeds to block 476, where the cache performs the arithmetic or logical operation of the atomic operation. The process then moves to decision block 477, where a determination is made as to whether a store is needed. For example, for some atomic operations, the store may be conditional. If the determination at decision block 477 is positive, the process moves to block 478, where the store is performed. The process then advances to block 479, where an ACK is returned to the processor. The process then proceeds to block 480, where the lock condition is de-asserted (e.g. with an unlock bit). The process then moves to the return block.

At decision block 477, if the determination is negative, the process advances to block 480.

At decision block 473, if the determination is negative, the process proceeds to block 481, where the instruction is broken into parts (one part for each bank that includes some of the source data). The process then move to block 482, where a lock condition is asserted. The process then advances to block 483, where for each part of the instruction, a load request is sent to the bank that includes that part of the source data. The process then proceeds to block 484 where the source data, once all of it is retrieved, is combined. The process then moves to block 485, where the operation is executed in the processor.

The process then proceeds to decision block 486, where a determination is made as to whether a store is needed. If the determination at decision block 486 is negative, the process moves to block 480. However, if the determination at decision block 486 is positive, the process advances to block 487, where the store data is broken into parts (one part for each bank that includes some of the source data). The process then proceeds to block 488, where a store is performed at each of the banks. The process then moves to block 489, where in ACK is returned to the processor for each bank. The process then advances to block 480.

Exemplary Embodiment of an L2 Cache Bank

Figure 5:
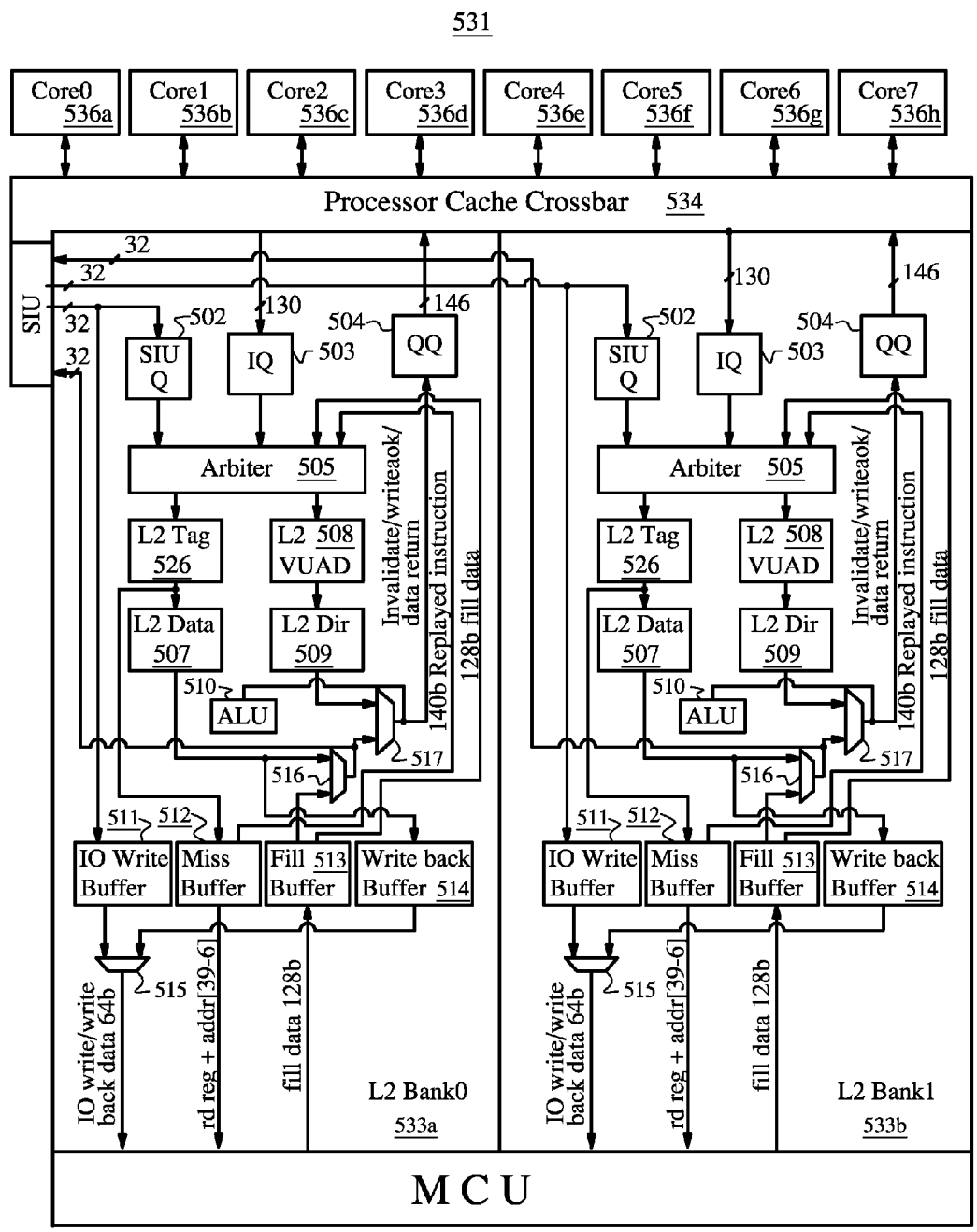
FIG. 5 shows a block diagram of an embodiment of a portion of the device of FIG. 2.

FIG. 5 shows a block diagram of an embodiment of a portion (590) of an embodiment of device 230 of FIG. 2. System interface unit (SIU) 501 may be employed as an embodiment of memory controller 232 of FIG. 2.

In one embodiment, each L2 cache bank, such as L2 cache bank 533a, includes SIU queue (SIU Q) 502, input queue (IQ) 503, output queue (OQ) 504, Arbiter 505, L2 Tag 506, L2 Data 507, L2 Valid, dirty, used, and allocated bits arrays (VUAD) 508, L2 Directory (Dir) 509, Arithmetic Logic Unit (ALU) 510, Input-Output (10) Write Buffer 511, Miss Buffer (MB) 512, Fill Buffer 513, Write Back Buffer 514, and multiplexers 515-517.

In one embodiment, the components of each L2 cache bank operate as follows:

IQ 503: The input queue is a first-in-first-out (FIFO) which queues packets arriving on the PCX when they cannot be immediately accepted into the L2 pipe.

SIU Q 502: Accepts packets from the SIU and issues them to the pipe after arbitrating against other requests.

Arbiter 505: The arbiter manages access to the L2 pipeline from the various sources which request access. The IQ, miss buffer (MB), SIU Q, fill buffer (FB) and stalled instruction in pipe all need access to the L2 pipe.

L2 Tag 506: holds the L2 tag array and associated control logic.

L2 VUAD 508: contains the Valid, Dirty, Used and Allocated bits for the tags in L2 organized in an array structure. There is one array for Valid and Dirty bits and a separate array for Used and Allocate bits.

L2 Data 507: Contains L2 Data storage and associated control logic.

L2 Directory 509: The directory maintains a copy of the L1 tags for coherency management and also ensures that the same line is not resident in both the icache and dcache (across all cores). The directory is split into an icache directory (icdir) and a dcache directory (dcdir), which are similar in size and functionality.

Miss Buffer 512: The Miss buffer stores instructions which cannot be processed as a simple cache hit. This includes true L2 cache misses (no tag match), instructions that have the same cache line address as a previous miss or an entry in the writeback buffer, instructions requiring multiple passes through the L2 pipeline (atomics and partial stores), unallocated L2 misses, and accesses causing tag Error Checking and Correction (ECC) errors.

Fill Buffer 513: The fill buffer is used to temporarily store data arriving from DRAM on an L2 miss request.

Writeback Buffer 514: The writeback buffer is used to store dirty evicted data from the L2 on a miss. Evicted lines are streamed out to DRAM opportunistically.

I/O Write Buffer 511: The I/O write buffer stores incoming data from the PCI-EX interface in the case of a 64 B write operation. In one embodiment, the PCI-EX interface bus width is only 32 bits wide, and the data is collected over 16 cycles before writing to DRAM.

ALU 510: The ALU performs ALU operation for atomic operations that are executed in the cache. Read data is one operand, the other is provided in the packet. The result is inserted into the miss buffer to be replayed as a store instruction.

OQ 504: The output queue is a first-in-first-out (FIFO) which queues packets going on the CPX when they cannot be immediately accepted.

Example Embodiment of an L2 Pipeline:

In one embodiment, the L2 pipeline has 9 stages, the details of which are described below for this embodiment.

Arbitration (PX2):
  Multiplex (Mux) between PCX, IQ, I/O, MB and FB and C1 (stalled) instructions Tag Access (C1):
  Tag access, VUAD Read and Bypass
  Tag Compare
  Miss Buffer content-addressable memory (CAM) Operation in Phase1.
  Miss Buffer Hit logic
  Generation of ECC for store data
  Generation & check of ECC for the access address
  WB) and FB CAM in Phase 2.

Way Select (Sel) Generation (C2):
  Tag Hit logic
  Replacement way logic (pseudo least recently used [LRU])
  Miss Buffer Hit generation and 2 cycle (cyc) bypass.
  Way select logic
  Set, index, column (col), way sel, read/write (rd/wr), word enables transmit (xmit) to the data array
  Stall for multicycle operations (e.g., Eviction, Fill etc) or column offset collision.

Way Sel Xmit (C3):
  Set, index, col, way sel, rd/wr, word enables xmit in the data array
  evict way sel generation and eviction logic
  MB tag write, MB Valid bit setting
  FB hit entry xmit to FB Data array (in 12b)

Data Access cyc1 (C4):
  Data array read/write cycle 1 (for load/store hit)
  FB data buffer read.
  Way sel transmit to data array for Fill only
  Setup directory inputs for CAM/write operations.

Data Access cyc2 (C5):
  Data array read/write cycle 2 (for load/store hit)
  Data array read cyc 1 for eviction
  WB tag write in the case of a dirty eviction
  VUAD array Write
  Way sel transmit within data array for Fill only
  stage FB data
  Write/CAM directory Data Access cyc3 (C52):
  Data array read/write cycle 3 for load/store hit), 4:1 mux for L2 data
  FB and L2 data mux
  Data array read cyc 2 for eviction
  Data array write cyc 1 for Fill Data Return xmit (C6):
  16B data xmit to tag block
  Data array read cyc 3 for eviction
  Invalidation vector processing.
  Request vector generation logic
  Data array write cyc 2 for Fill Error Correction (C7):
  Error Correction/Detection
  Request vector to OQ/CPX
  Data array write cyc 3 for Fill Data Response (C8):
  L2 data and Invalidation data MUX
  Data xmit to OQ/CPX
  Write WBB data
  64b data merge for partial store instrictions
  ALU operation for atomic operations. Read data is one operand, the other is provided in the packet. The result is inserted into the miss buffer to be replayed as a store instruction.

Exemplary Embodiment of Atomic Operation Executed in the L2 Cache:

In one embodiment, execution of atomic operations in the L2 cache and partial stores each employ two passes. In one embodiment, a partial store uses a read-modify-write (RMW) operation in the L2. In the RMW case, the store makes two passes through the pipe. In the first pass, the existing data is read (like a load). At the end (stage C8 above), the store data is merged with the read data. The instruction with the merged data is then written to the miss buffer. The store then issues from the miss buffer for its second pass, where the write to the cache is actually performed.

In one embodiment, the atomic operations performed in the L2 cache operate in a similar manner, except that instead of a simple merge, the appropriate ALU operation is performed. Below is the list of atomic instructions that are executed in the L2 for one embodiment of the invention in which the x86 instruction set is employed, and the ALU operation performed to support it.

| Instruction | L2 ALU op | List of ALU ops performed in the L2 |
|---|---|---|
| ADC | ADD | ADD |
| ADD | ADD | AND |
| AND | AND | XOR |
| BTC | XOR | OR |
| BTR | AND | SUB |
| BTS | OR | SWAP |
| CMPXCHG | CMP + SWAP | CMP |
| DEC | SUB | |
| INC | ADD | |
| NEG | SUB | |
| NOT | XOR | |
| OR | OR | |
| SBB | SUB | |
| SUB | SUB | |
| XADD | ADD | |
| ZHG | SWAP | |
| XOR | XOR | |

Figure 6:
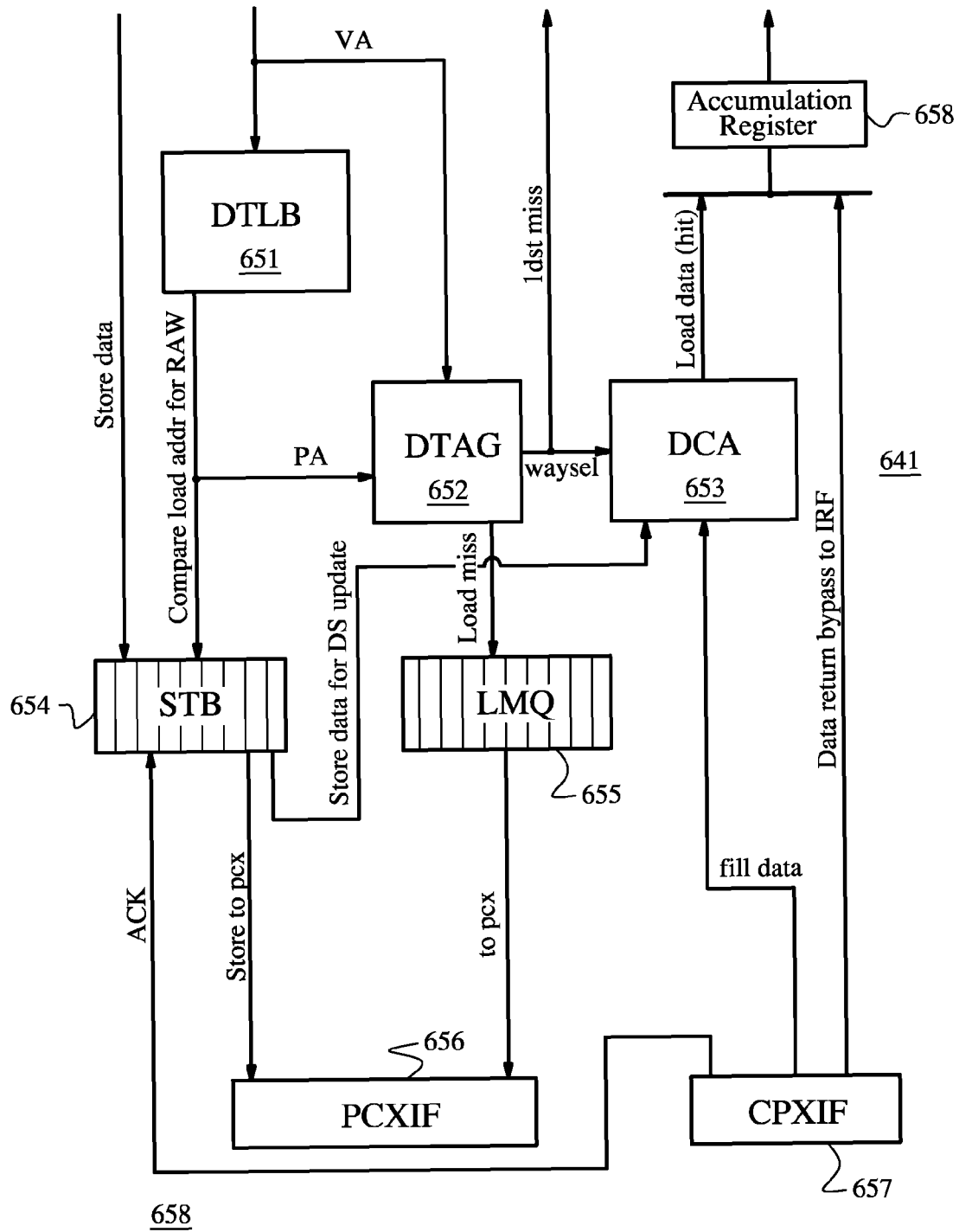
FIG. 6 illustrates a block diagram of an embodiment of the LSU of an embodiment of the device of FIG. 2, arranged in accordance with aspects of the present invention.

FIG. 6 illustrates a block diagram of an embodiment of LSU 641, which may be employed as embodiment of LSU 241 of FIG. 2.

LSU 641 is the unit responsible for interfacing with memory. LSU 641 receives store data from and returns load data to the execution unit. In operation, a sequence of store instructions is buffered by LSU 641 for delivery to the L2 cache (e.g. L2 cache 233 of FIG. 2). LSU 641 may be configured to process data memory references, such as integer and floating-point load and store instructions. LSU 641 may include a data cache, constructed of a tag array portion of the data cache (DTAG) 652 and data cache array (DCA) 653, as well as logic configured to detect cache misses and to responsively request data from the L2 cache via crossbar interface 658. Crossbar interface 658 includes PCXIF 656 and CPXIF 657. In one embodiment, data cache 652, 653 may be configured as a write-through cache in which all stores are written to the L2 cache regardless of whether they hit in data cache 652, 653. In some such embodiments, stores that miss in data cache 652, 653 may cause an entry corresponding to the store data to be allocated within the cache. In other embodiments, data cache 652, 653 may be implemented as a write-back cache.

In one embodiment, LSU 641 includes a store buffer (STB) 654 for holding all outstanding store instructions. In this embodiment, stores are issued in age order (per thread) to the PCX interface 656, and may also be sent to update the data cache array 653. Once a store operation is completed (e.g., a store to the L2 cache), an acknowledgement signal (ACK) is returned via the CPX interface 657 to the store buffer 654. LSU 641 may also include a load miss queue (LMQ) 655 configured to store records of pending memory accesses that have missed in data cache 652, 653.

Additionally, in some embodiments LSU 641 may include logic configured to translate virtual data addresses generated by execution units (e.g. 248 of FIG. 2) to physical addresses, such as a Data Translation Lookaside Buffer (DTLB) 651.

As illustrated in FIG. 6, store instructions are inserted into the STB 654 after address translation through the DTLB 651, assuming the stores do not page fault or take an exception. The STB 654 may be threaded and contain eight entries per thread. Each load to the processor core checks the STB 654 (same thread only) for read-after-write (RAW) bypass opportunities. In one embodiment, control logic for the STB 654 is used to control store issuance using a pseudo-LRU (least recently used) algorithm to select which thread to issue. This control logic may be included in LSU 641 and/or the gasket interface (e.g. gasket interface 249 of FIG. 2) to fairly pick store requests and to sequence and/or pipeline the store operations as described herein. The store remains in STB 654 until an acknowledgment (ACK) is received via the CPX interface 657 from the L2 cache, and the data cache array 653 is updated with the store data if necessary. In one embodiment, STB 654 is organized as a CAM which contains the tag portion of the address and a byte mask, and a RAM which contains the data and status bits.

In the example implementation depicted in FIGS. 2 and 6, the processor chip 230 uses a banked L2 cache 233 as a global ordering and coherence enforcement mechanism for all potential thread operations from cores 236a-h. In one embodiment, the ordering of L2 cache store operations from each processor core (such as might occur after a cache miss) uses the following sequence of operations. When a store arrives at the head of store buffer 654, it is sent to the L2 cache 233, as illustrated with the "store" signal from core C1 236a to the first bank 233a of L2 cache 233. If the data is in L2 cache 233, the store is performed, and an acknowledgement is sent back to the requesting core, as illustrated with the "ACK" signal from the first bank 233a of L2 cache 233 to the core C1 236a. If the data misses in the L2 cache 233, it is fetched from memory (e.g., 231), and the store is performed. This is illustrated with the "store" signal from core C8 236h to the memory (e.g., 231-4) and the "Return" signal that is sent back to the requesting core C8 236h. In either case, an acknowledgement (ACK) is sent back to the requesting store buffer 654 to signal that the store has been globally ordered. That is, the new value of the store will be eventually visible to all other processors or threads. Once the requesting store buffer 654 receives the ACK signal, the store is de-queued from the store buffer 654, and the next store is sent to the L2 cache 233.

The operation of a misaligned atomic is as follows in one embodiment. For atomic memory addresses, data cache 652 and 653 determines whether the address is mis-aligned. Upon detecting that the address is misaligned, LSU 641 breaks the instruction into two (or more) pieces, one for each bank of the L2 that has part of the atomic memory address source data. These two "partial" instructions are placed in load miss queue (LMQ) 655. Next, the two load requests are sent in parallel to the L2 banks that contain a portion of the atomic memory address source data. Load data is received from the L2 cache via cache to processor interface (CPXIF) 657, and is assembled in accumulation register 658. After both pieces of the load have been returned and the assembled data is ready, it is passed back to the execution unit (e.g. execution unit 248 of FIG. 2) along with source data and details (type of operation, register address of the other operand) about the operation to perform. Then the execution unit performs the necessary operation and passes the result back to LSU 641 on the store data bus. LSU 641 then splits the store data into two pieces, each corresponding to one of the L2 banks to be addressed. The store data is sent to each L2 bank.

The exact procedure performed may vary for different operations. For an ADD operation, data from memory is ADDed to data specified by the instruction (usually in a register or pair of registers), then written back to memory. In this case the destination data is supplied by the ALU. A compare-and-exchange compares the load data to the other operand (specified in a register or pair of registers), then updates the destination if the comparison is true. The destination data need not be supplied by the ALU in this case.

In one embodiment, bounding this operation is the locking mechanism that prevents another thread from accessing an intermediate value. The lock is activated at the beginning of the process and released once both stores have been acknowledged. The lock mechanism may be accomplished in more than one way in various embodiments, three of which are described in greater detail above.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A device for executing atomics, comprising:
   a crossbar that includes a processor-to-cache interface (PCX) and a cache-to-processor interface (CPX);
   a processor coupled to the crossbar, the processor including a control unit and a datapath, wherein the processor:
   controls execution of an atomic instruction in accordance with an instruction set architecture that includes one or more atomic operations within the instruction set, in which for each of the one or more atomic operations a load, an arithmetic or logical operation, and a store are each capable of being performed within the atomic operation, wherein the instruction set is such that source data for a memory address can be divided among more than one bank of a plurality of banks of a banked memory cache, wherein the banked memory cache is coupled to the crossbar, wherein each of the plurality of banks of the banked memory cache includes a plurality of separate lines, and wherein controlling execution of the atomic instruction is accomplished such that controlling execution of the atomic instruction includes, for the one or more atomic operations:
   generating an atomic memory address;
   determining whether the atomic memory address source data is included in its entirety in one bank of the plurality of banks of the banked memory cache; and
   if it is determined that the atomic memory address source data is included in its entirety in one bank of the plurality of banks of the banked memory cache:
   enabling the bank that includes the atomic memory address source data to perform the arithmetic or logical operation of the one or more atomic operations within the bank that includes the atomic memory address source data; otherwise if it is determined that the atomic memory address source data is divided among two or more particular banks of the banked memory cache:

generating requests to fetch each part of the atomic memory address source data to the processor via a corresponding one of the plurality of separate lines for the two or more particular banks of the banked memory cache; and asserting a lock condition on each corresponding one of the plurality of separate lines; and performing the arithmetic or logical operation of the at least one of the atomic operations within the processor; and wherein the processor in conjunction with the crossbar performs multiple atomic operations concurrently in parallel via the separate lines of the banked memory cache.

2. The device of claim 1, wherein the atomic instructions includes a compare-and-exchange atomic instruction.

3. The device of claim 1, wherein the instruction set is x86.

4. The device of claim 1, wherein the processor includes a load-store unit (LSU);

the LSU includes a data cache, an execution unit, and an accumulation register; and wherein the data cache that is configured to make the determination as to whether the atomic memory address source data is included in its entirety in one bank of the plurality of banks of the banked memory cache.

5. The device of claim 4, wherein:

the LSU is employed to:

if it is determined that the atomic memory address source data is included in its entirety in one bank of the plurality of banks of the banked memory cache:

send a request to the banked cache to execute the atomic instruction in the L2 cache, wherein the request includes the atomic memory address.

6. The device of claim 4, wherein the LSU is employed to:

if it is determined that the atomic memory address source data is divided among more than one bank of the plurality of banks of the banked memory cache:

break the atomic memory instruction into a plurality of parts, including a separate part corresponding to each bank that includes a portion of the atomic memory address source data;

assert a lock condition;

send a load request for each part of the atomic memory instruction; receive requested load data;

use the accumulation register to combine the requested source data; send at least the combined source data to the execution unit of the processor for execution;

after the execution, receive result data;

break the result data into a plurality of parts, including a separate part corresponding to each bank that includes a portion of the atomic memory address source data;

send a store request for each part of the plurality of parts of the result data; and de-assert the lock condition when storing of each part of the plurality of parts of the result data is acknowledged.

7. The device of claim 1, wherein the processor is capable of controlling execution of a plurality of threads.

8. The device of claim 7, wherein the processor includes a plurality of multithreaded core processors.

9. The device of claim 7, wherein the processor controlling execution of the instruction further includes, for the atomic instructions:

asserting a lock condition such that the other threads are prevented from accessing the atomic memory address source data while the lock condition is asserted; and de-asserting the lock condition after the store of the atomic instruction is complete.

10. The device of claim 9, further comprising:

a crossbar that is coupled to the processor, wherein the processor includes a processor-to-cache interface (PCX) and a cache-to-processor interface (CPX), wherein the crossbar is configured to lock each bank of the plurality of banks of the banked cache memory from memory access by other threads of the plurality of threads when the lock condition is asserted.

11. The device of claim 9, further comprising:

a crossbar that is coupled to the processor, wherein the processor includes a processor-to-cache interface (PCX) and a cache-to-processor interface (CPX), wherein the crossbar is configured to lock each of the banks that includes a portion of the atomic memory address source data from memory access by other threads of the plurality of threads when the lock condition is asserted.

12. The device of claim 9, further comprising:

the banked memory cache, wherein each of the plurality of banks of the banked memory cache includes a plurality of lines, and wherein the banked memory cache is configured to block access by other threads of the plurality of threads to the line of the plurality of lines that includes at least a portion of the atomic memory address source data when the lock condition is asserted.

13. A device for executing atomics, comprising:

a banked memory cache having a plurality of banks, wherein each bank of the plurality of banks includes:

a plurality of separate lines and is arranged to, for an execution of at least one atomic instruction of an instruction set that includes at least one atomic operation:

if the atomic instruction includes an atomic memory address for which the atomic memory address source data is included entirely within the bank:

perform an arithmetic or logical operation of the atomic operation within the bank; and else if a portion of the atomic memory address source data is included within the bank:

send the portion of the atomic memory address source data to a processor; and perform the arithmetic or logical operation of each of multiple atomic operations within the processor concurrently via the separate lines of the banked memory cache; and a miss buffer; and wherein each bank of the plurality of banks, for an execution of the at least one atomic instruction of the instruction set, if the atomic instruction includes an atomic memory address for which the atomic memory address source data is included entirely within the bank:

performs two passes through a cache pipeline for the bank, such that performing the two passes includes performing a first pass and performing a second pass, performing the first pass includes reading the source data corresponding to the atomic memory address source data, performing the arithmetic or logical operation, and writing a result of the arithmetic or logical operation to a miss buffer; and such that performing the second pass includes performing a store based on the result.

14. The device of claim 13, wherein the banked memory cache is a banked L2 cache.

15. The device of claim 13, further comprising:
a crossbar that is coupled to the processor, wherein the crossbar includes a processor-to-cache interface (PCX) and a cache-to-processor interface (CPX) and is coupled to the banked memory cache, the device is arranged to assert a lock condition during execution of the at least one atomic instruction such that threads other than the thread associated with the atomic instruction are prevented from accessing the atomic memory address source data during the lock condition, each bank of the plurality of banks includes an ALU, and wherein the ALU is arranged to perform the arithmetic or logical operation during the first pass.

* * * * *